June 2, 1925.  
J. H. HAMMOND, JR  
SYSTEM OF TELEDYNAMIC CONTROL  
Original Filed March 21, 1913  
1,540,121
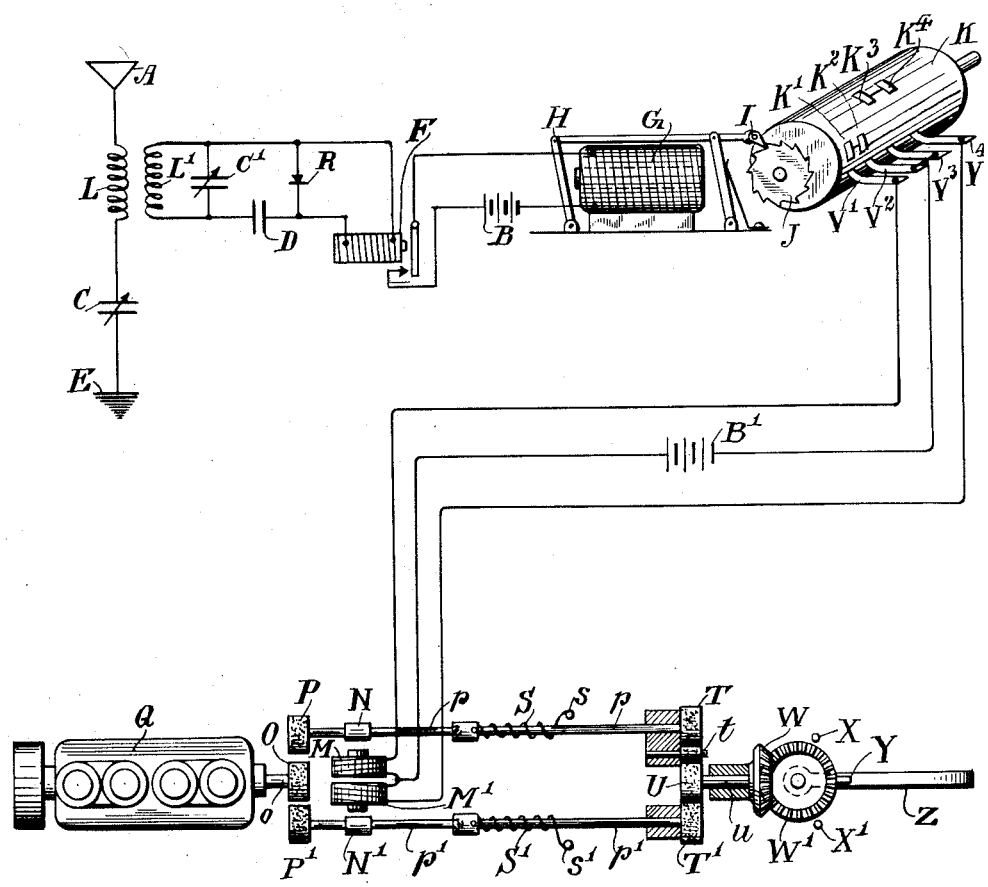
WITNESSES
INVENTOR
ATTORNEYS Patented June 2, 1925.

1,540,121

UNITED STATES PATENT OFFICE.

JOHN HAYS HAMMOND, JR., OF GLOUCESTER, MASSACHUSETTS.

SYSTEM OF TELEDYNAMIC CONTROL.

Application filed March 21, 1913, Serial No. 755,841. Renewed July 24, 1923.

*To all whom it may concern:*

Be it known that I, JOHN HAYS HAMMOND, Jr., a citizen of the United States, residing at Gloucester, in the State of Massachusetts, have invented certain new and useful Improvements in Systems of Teledynamic Control, of which the following is a specification.

This invention relates to systems for controlling and operating mechanisms at a distance, and relates more particularly to systems where transmitted radiant energy is employed to cause power to be applied by an engine to the operation of steering gear and other mechanisms on a torpedo or other vessel.

The accompanying drawing shows a receiving station on my system, which may be located on a torpedo or other vessel. It is to be understood that there is a corresponding transmitting station, capable of sending out tuned electric oscillations.

In the drawing, A is a receiving antenna, in circuit with the inductance coil L and variable condenser C, and grounded at E. The oscillation circuit $L'$ $C'$, comprising the inductance coil $L'$ and the variable condenser $C'$, is coupled to the antenna circuit by means of the coils L and $L'$, and both this oscillation circuit and the antenna circuit are tuned to the wave length of the corresponding transmitting station. By means of the stopping condenser D and the rectifier R, unidirectional current impulses are supplied to the relay F, which, when energized, allows current to flow from battery B through the electromagnet G. The latter, when energized, attracts the armature H, and so causes the pawl I to engage with the ratchet wheel J and rotate the latter. The ratchet wheel J is attached to the rotatable cylindrical commutator K, on which are the contact pieces $K'$, $K^2$, $K^3$ and $K^4$. The contact pieces are in pairs, $K'$, $K^2$ and $K^3$, $K^4$, the members of each pair being electrically connected, and they make contact, respectively with the brushes $V'$ $V^2$, $V^3$ and $V^4$. There are similar pairs of contact pieces around the surface of the commutator, which are not shown, each pair being separated by a neutral space.

The brushes $V'$ and $V^2$ are in circuit with battery $B'$ and electromagnet M, and the brushes $V^3$ and $V^4$ are in circuit with battery $B'$ and electromagnet $M'$. The brushes $V^2$ and $V^3$ are electrically connected with each other and with one pole of the battery $B'$, the other pole of which is connected to the electromagnets M and $M'$, as shown. This arrangement enables one battery to be used instead of two, and three conductors instead of four between the brushes and the electromagnets.

Q is a gas engine or other prime mover which drives the torpedo or other vessel, and which also turns an auxiliary shaft $o$, on which is a friction wheel O. P and $P'$ are friction wheels which are normally out of contact with friction wheel O, and which are attached to shafts $p$ and $p'$, respectively. Shafts $p$ and $p'$ can rotate in fixed bearings at their right ends, but have a range of linear movement at their left end sufficient to enable the friction wheels P and $P'$ to engage with the friction wheel O when the armatures N and $N'$, on the shafts $p$ and $p'$, respectively, are attracted by the electromagnets M and $M'$, respectively. Attached to right end of the shaft $p$ is the friction wheel T which is in contact with the intermediate friction wheel $t$, the latter being in contact with the friction wheel U. Attached to the right end of the shaft $p'$ is the friction $T'$, which is in direct contact with the friction wheel U. Friction wheel U is attached to a shaft $u$, which can rotate in a fixed bearing, at the other end of which shaft is the bevel gearing $WW'$ the latter being operatively connected with the rudder Z. Y is a projecting rod or piece on the gear wheel $W'$, and X and $X'$ are fixed pins which limit the movement of Y and so act as stops for the gearing $WW'$ and rudder Z. S and $S'$ are springs, attached at one end to the shafts $p$ and $p'$, and at their other end to fixed points $s$ and $s'$, respectively. These springs restore the shafts $p$ and $p'$ respectively, to their original position, and the rudder Z to its central position, when the friction wheels P and $P'$ are released from contact with the friction wheel O.

The operation of my invention is as follows:—When electric waves in tune with the receiving antenna circuit A L C and the oscillation circuit $I'$ $C'$ are received, the relay F will be operated through the stopping condenser D and rectifier R, and the electromagnet G will be energized. Armature H will therefore be attracted and pawl I will turn ratchet wheel J and commutator K. If commutator K is turned so that contacts K' and K² make contact with the brushes V' and V², electromagnet M will be energized by means of battery B' and will attract armature N. Friction wheel P will therefore be brought into contact with friction wheel O. If wheel O is turning in a counter-clockwise direction, viewed from astern, wheel P, shaft p and wheel T will be turned in a clockwise direction, intermediate wheel t will be turned in a counter-clockwise direction, and wheel U, shaft u and the bevel gear wheel W will all be turned in a clockwise direction. The rudder Z will therefore be turned to starboard. The rudder can turn only until the rod Y strikes the pin X, when the rudder and the bevel gearing will be stopped and the friction wheels will slip past each other.

When the next signal is received by the receiving station the commutator K will be turned to one of its neutral positions, the electromagnet M will be de-energized, the wheel P will move out of contact with wheel O and the spring S will turn shaft p, friction wheels T, t and U, bevel gearing WW' and rudder Z to their original position.

When the next signal is received, the commutator K will be turned so that contacts K³ and K⁴ make contact with brushes V³ and V⁴. Electromagnet M' will therefore be energized and will attract armature N', which will bring wheel P' into contact with wheel O. If O turns in a counter-clockwise direction, as before, wheel P', shaft p' and wheel T' will be turned in a clockwise direction, wheel U, shaft u and the bevel gear wheel W will all be turned in a counter-clockwise direction, and the rudder Z will be turned to port. The rudder can turn only until the rod Y strikes the pin X'.

The next signal received by the receiving station will turn the commutator K to a neutral position, the electro-magnet M' will be de-energized, the wheel P' will move out of contact with wheel O, and the spring S' will turn shaft p', friction wheels T', and U, bevel gearing WW' and rudder Z to their original position. This will complete the cycle of operations, and the next signal received will cause the rudder to be turned to starboard, as above described.

The function of intermediate wheel t is to cause wheel U to be moved in one direction when wheel P makes contact with wheel O, and in the opposite direction when wheel P' makes contact with O. Engine Q is supposed to be turning shaft o and wheel O continuously in one direction while the above described cycle of operations is in progress, and while in this description I have assumed the direction of rotation to be counter-clockwise, it might just as well be clockwise, when, of course, the direction of turning of the rudder, for any given position of the commutator K, will be the reverse of that described above.

Q may be a gas or gasoline engine, a compressed air engine, a steam engine, an electric motor, or any other kind of engine or motor, and it may be used to drive a propeller or for any other purpose. The gearing T, t, U and T' might consist of toothed wheels instead of friction wheels. I may use receiving circuits tuned to group frequency or amplitude-variation frequency as well as to wave length; and in general, I do not confine myself to the particular apparatus and mechanisms here shown, but various changes and modifications, within the knowledge of those skilled in the art, may be made in the particular apparatus shown and described herein, without departing from the spirit of my invention, provided the means set forth in the following claims be employed.

Having thus described my invention, I claim:—

1. The combination with a driving element arranged to rotate about a fixed axis of a flexible shaft normally out of operative engagement with said driving element, a fixed bearing by which said shaft is supported to rotate about a fixed axis extending longitudinally of said shaft, means to flex said shaft to move said shaft into operative engagement with said driving element to be rotated thereby, and yielding means secured to said shaft and automatically operative to reverse the rotation of said shaft and return said shaft to an initial position of rotation after it has been rotated by and released from said driving element.

2. The combination with a driving element arranged to rotate about a fixed axis of a flexible shaft normally out of operative engagement with said driving element, a fixed bearing by which said shaft is supported to rotate about a fixed axis extending longitudinally of said shaft, means to flex said shaft to move said shaft into operative engagement with said driving element to be rotated thereby, and yielding means secured to said shaft and automatically operative to reverse the rotation of said shaft and return said shaft to an initial position of rotation after it has been rotated by and released from said driving element, and steering means controlled by said shaft.

3. The combination with a motor, and a friction disc driven thereby, of a pair of flexible shafts normally out of engagement with said disc journalled so as to rotate about fixed axes extending longitudinally of the shafts respectively, a pair of magnets for selectively flexing said shafts into operative engagement with said disc to be rotated thereby, and yielding means secured to each of said shafts and automatically operative to reverse the rotation of the respective shaft until returned to its initial position after it has been rotated by and released from engagement with said friction disc.

4. The combination with a motor, and a friction disc driven thereby, of a pair of flexible shafts normally out of engagement with said disc journalled so as to rotate about fixed axes extending longitudinally of the shafts respectively, a pair of magnets for selectively flexing said shafts into operative engagement with said disc to be rotated thereby, a stop for each of said shafts for limiting the movement thereof, and yielding means secured to each of said shafts and automatically operative to reverse the rotation of the respective shaft until returned to its initial position after it has been rotated by and released from engagement with said friction disc.

This specification signed and witnessed this 18th day of March, A. D., 1913.

JOHN HAYS HAMMOND, Jr.

Signed in the presence of:
M. P. WINNE,
DOROTHY F. DAMES.